United States Patent
Hennick

[11] Patent Number: 5,189,945
[45] Date of Patent: Mar. 2, 1993

[54] WATER COOLED BARBECUE GRILL

[76] Inventor: Donald C. Hennick, 625 Western Ave., Seattle, Wash. 98104

[21] Appl. No.: 793,591

[22] Filed: Nov. 18, 1991

[51] Int. Cl.$^5$ ............................................. A47J 37/00
[52] U.S. Cl. ........................................ 99/339; 99/416; 99/448; 99/450; 99/357; 126/25 R; 126/369
[58] Field of Search .................. 99/339, 340, 345–347, 99/352, 355, 357, 403, 410, 413, 416, 417, 426, 448, 449, 450, 484, 517; 126/9 R, 25 R, 29, 152 B, 369

[56] References Cited

U.S. PATENT DOCUMENTS

| | | |
|---|---|---|
| 70,077 | 10/1867 | Dewey . |
| 1,233,216 | 8/1917 | Thomas, Jr. . |
| 1,294,159 | 2/1919 | Potts . |
| 1,432,335 | 10/1922 | Howard . |
| 1,775,790 | 9/1930 | Tawlks . |
| 2,138,706 | 11/1938 | Myers ................................ 99/339 |
| 2,469,778 | 5/1949 | Morici ................................ 99/339 |
| 2,570,189 | 10/1951 | Backstrom ........................ 126/5 |
| 3,109,359 | 11/1963 | Falla .................................. 99/339 |
| 3,246,644 | 4/1966 | Peterson .......................... 126/344 |
| 3,320,945 | 5/1967 | Dunkelman ..................... 126/369 |
| 3,364,844 | 1/1968 | Felske ................................ 99/448 |
| 3,472,221 | 10/1969 | Stevens ............................ 126/152 |
| 3,493,726 | 2/1970 | Bardeau .......................... 219/443 |
| 3,717,083 | 2/1973 | Karapetian ...................... 99/450 |
| 3,818,818 | 6/1974 | Hice, Sr. ........................... 99/330 |
| 3,982,476 | 9/1976 | McLane ............................ 99/339 |
| 4,197,791 | 4/1980 | Vieceli et al. .................... 99/339 |
| 4,224,862 | 9/1980 | Liebermann ..................... 99/331 |
| 4,373,511 | 2/1983 | Miles et al. ...................... 99/467 |
| 4,604,989 | 8/1986 | Kita .................................. 99/413 |
| 4,632,089 | 12/1986 | Wardell ............................ 126/25 |
| 4,702,160 | 10/1987 | Manganese ..................... 99/417 |
| 4,798,132 | 1/1989 | Chan ................................ 99/331 |
| 4,920,872 | 5/1990 | Henry .............................. 126/25 R |

Primary Examiner—Timothy F. Simone
Attorney, Agent, or Firm—Joan H. Pauly

[57] ABSTRACT

A grilling surface is cooled by circulating water from a reservoir. The surface is preferably formed by two parallel metal sheets which are deformed to space them apart and to form heat passageways therethrough. The sheets and the circulation passageway formed therebetween extend continuously between and around the heat passageways. Reservoirs on the sides of the circulation passageway are in direct communication therewith and are configured to receive pans. Food in the pans is cooked by heat from the water in the reservoir. Covers on the grill and pans may be aligned to communicate steam from the pans to a grilling chamber formed by the grill cover. The grilling surface may be flat. Alternatively, it may have a wok-like configuration.

11 Claims, 7 Drawing Sheets

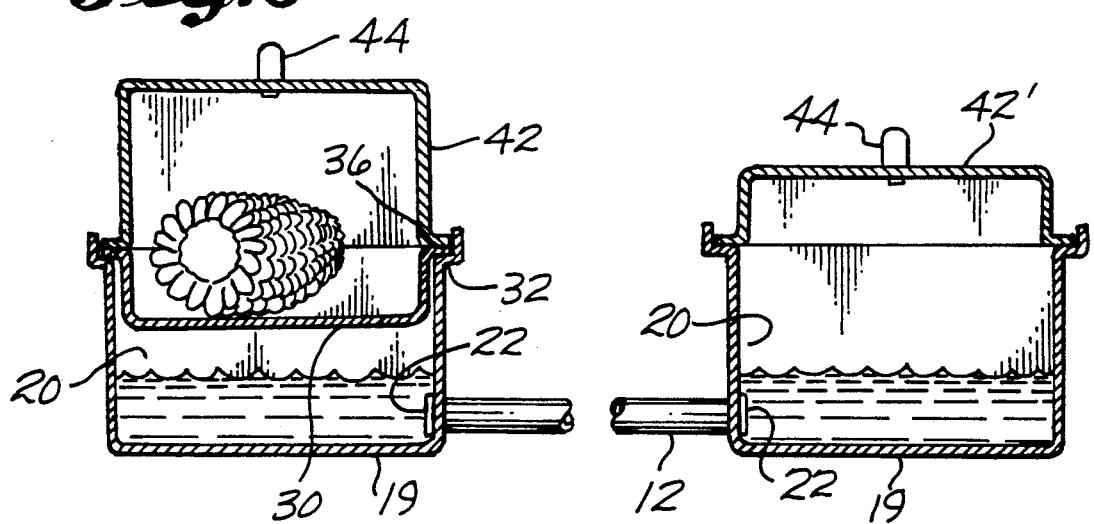
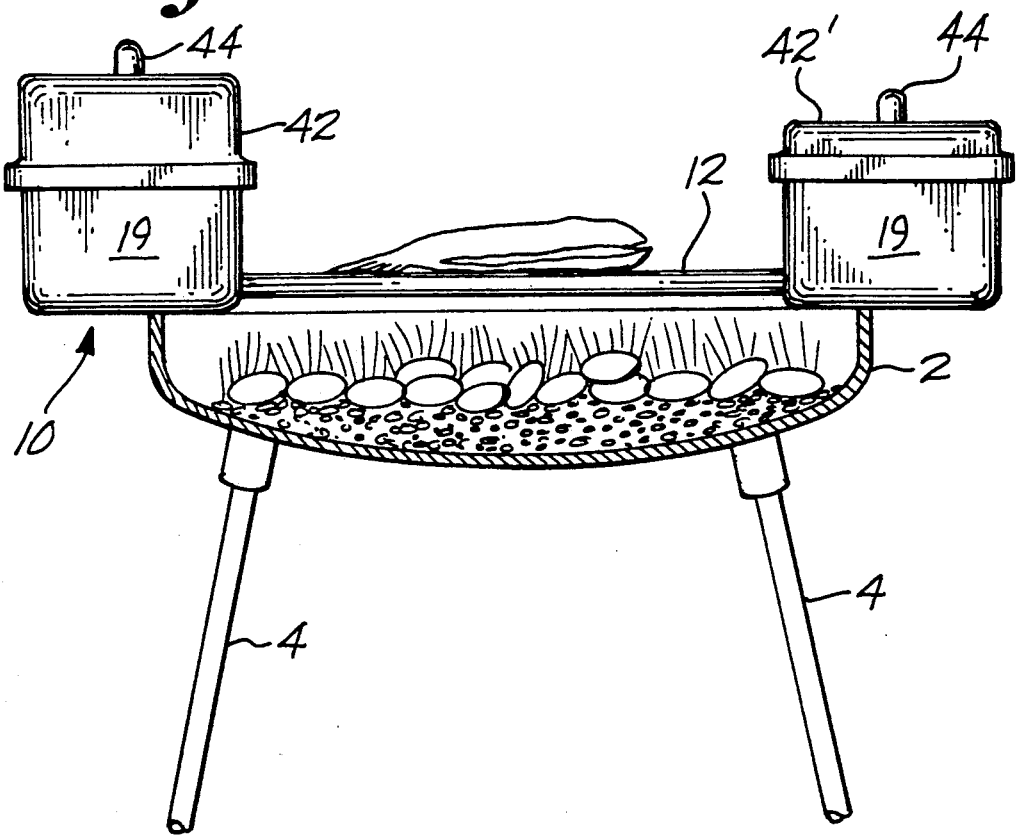

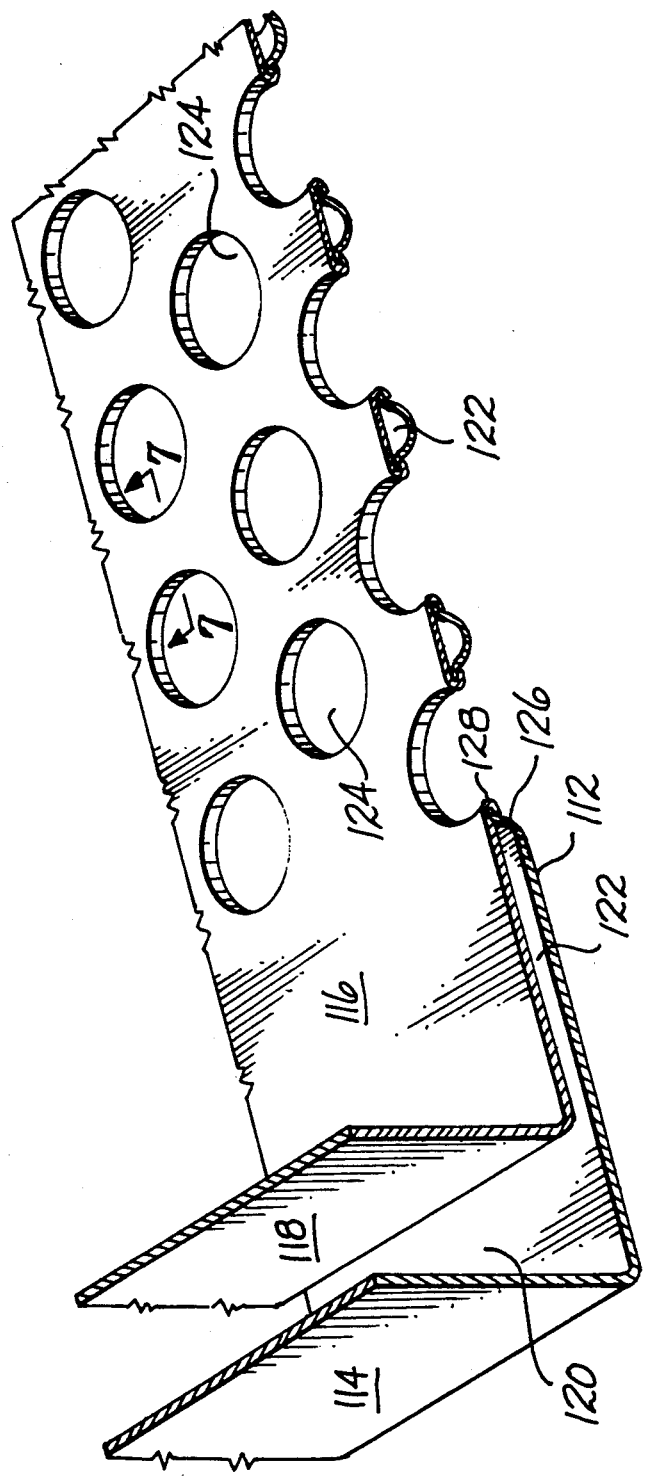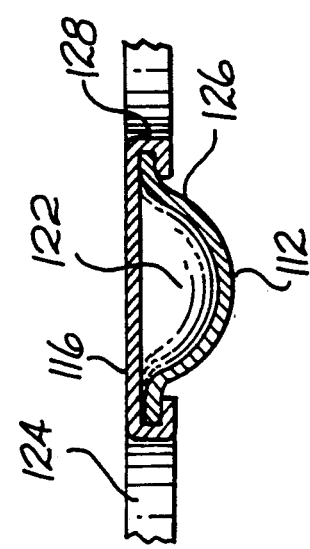

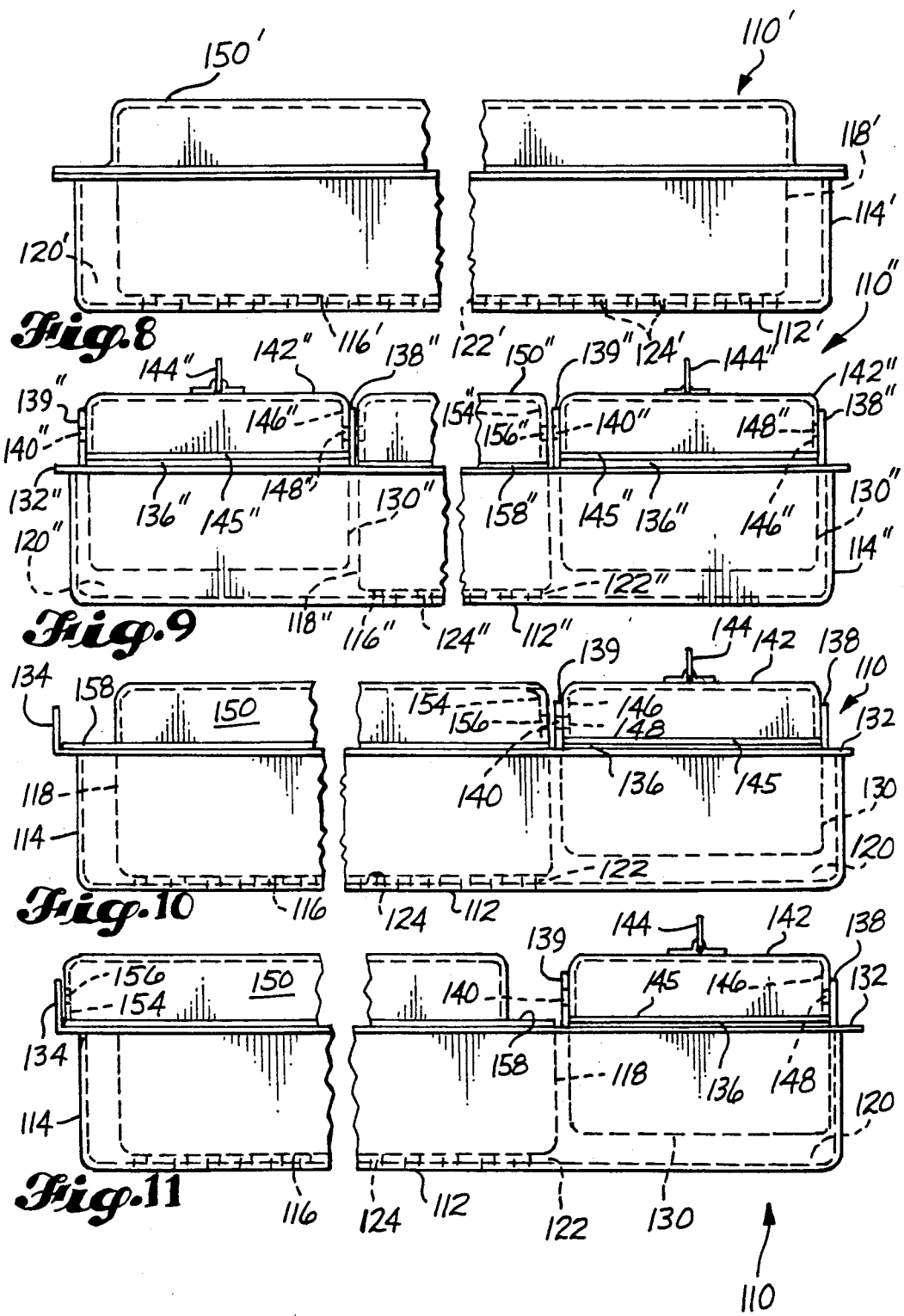

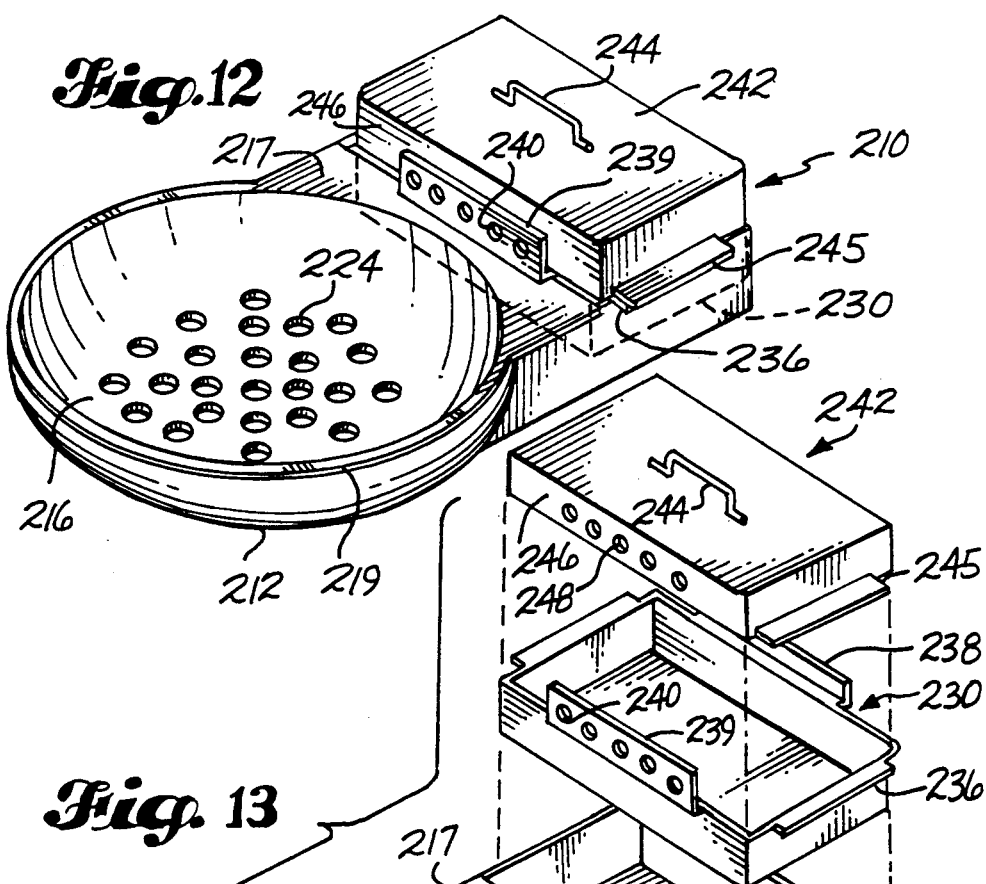
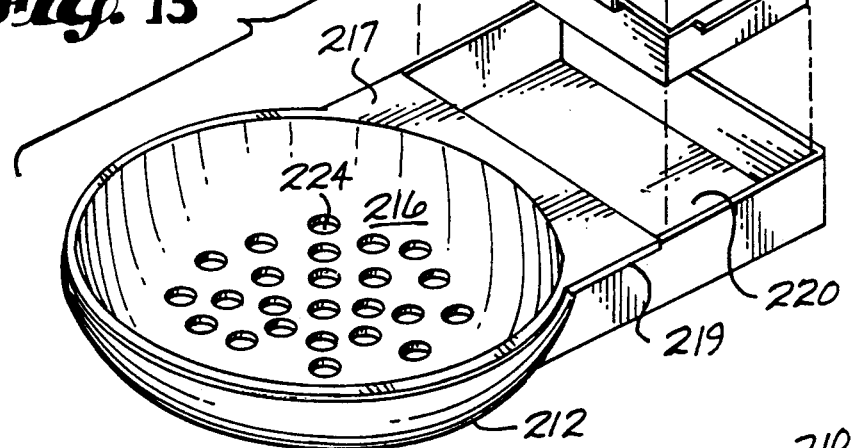
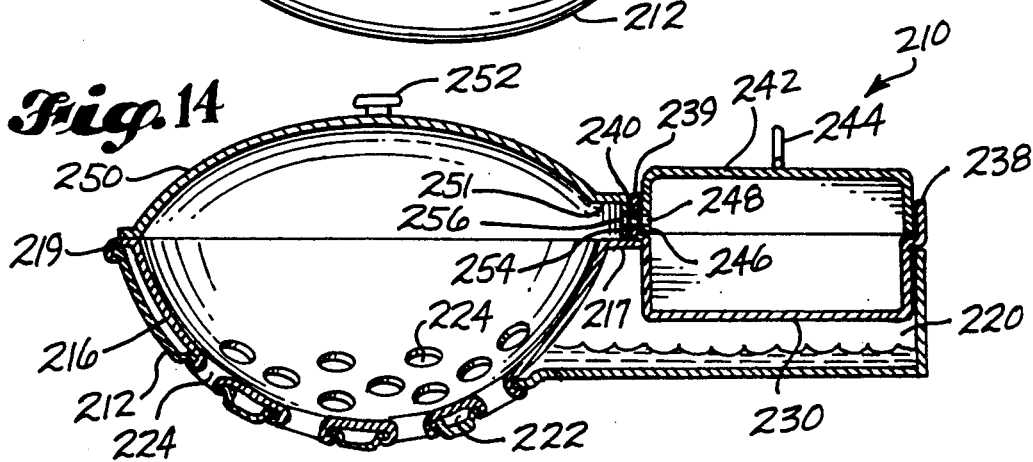

WATER COOLED BARBECUE GRILL

TECHNICAL FIELD

This invention relates to barbecue grills and, more particularly, to grills in which circulating water cools the cooking surface to prevent food from sticking to the surface, and pans fit into reservoirs adjacent to the cooking surface for using the heated water in the reservoirs to cook food in the pans.

BACKGROUND INFORMATION

Barbecue grills enjoy a continuing popularity for outdoor cooking. A perennial problem is the difficulty in cleaning the grill surfaces on which food is placed. These surfaces tend to become encrusted with burned grease and bits of food. Another problem associated with barbecue cooking is that some types of food tend to crumble when cooked on the thin metal rods which comprise the conventional type of barbecue grill. This problem is especially troublesome in connection with types of food that have recently become more popular among health conscious people. These foods include fish and tofu, which are barbecued to reduce consumption of red meat. Conventional barbecue grills also are limited in that they do not provide any means for cooking diced food or steaming vegetables.

U.S. Pat. No. 4,632,089, granted Dec. 30, 1986, to Lawrence Wardell, discloses a barbecue grill having hollow tubular members instead of the conventional solid metal rods. Water is circulated through the hollow tubular members to cool the grill and reduce the necessity to clean it. The water is supplied to the members through a circular supply tube extending around the periphery of the grill. The water may be supplied from an independent water source or as part of a closed circulating system. The circulation of the water is described as increasing cooking efficiency because of increased heat and steaming action from condensation that occurs during cooking.

U.S. Pat. No. 4,798,132, granted Jan. 17, 1989, to H. W. Chan, discloses a serpentine tubular grid for cooking over a fire. A heat exchange medium, such as water or Freon (trademark) is circulated through the tubing during the cooking to reduce the tendency of the food to stick.

U.S. Pat. No. 1,233,216, granted Aug. 28, 1917, to C. O. Thomas, Jr., discloses a portable field kitchen with nesting members. The kitchen includes a tank and a tubular grate through which water from the tank circulates. Boilers and roasting pans are placed on the tubular grate and/or over a fire for cooking. When the cooking has been completed, the water can be used for cleaning.

U.S. Pat. No. 70,077, granted Oct. 22, 1867, to G. Dewey, discloses a reservoir cooking stove. The stove includes a boiler, an oven, and a hollow grate in the oven. The grate is in communication with the boiler for circulating heated water therethrough to cook food in the oven or heat a room.

U.S. Pat. No. 1,294,159, granted Feb. 11, 1919, to T. E. Potts, discloses a gas broiler having a tubular grate through which combustion gases circulate to heat the grate. Potts states that soot and burned grease tend to collect on the grate, which are therefore removable for cleaning. U.S. Pat. No. 1,775,790, granted Sept. 16, 1930, to J. T. Tawlks, discloses a furnace grate bar that is cooled by circulation of water through a pipe coil embedded in the bar. Tawlks states that the bar will require practically no cleaning. U.S. Pat. No. 3,818,818, granted June 25, 1974, to J. O. Hice, Sr., discloses a cooking chamber having a cooking coil through which a coolant is circulated to rapidly reduce the temperature in the chamber. U.S. Pat. No. 4,224,862, granted Sept. 30, 1980, to B. E. Liebermann, discloses a warming oven having a coiled pipe within the walls of each of a plurality of support shelves for radiating heat.

U.S. Pat. No. 3,982,476, granted Sept. 28, 1976, to J. S. McLane, discloses barbecue cooking apparatus with a corrugated perforated food platform. U.S. Pat. No. 4,197,791, granted Apr. 15, 1980, to J. L. Vieceli et al. discloses an electric steamer for simultaneously steaming a frankfurter and a frankfurter bun in which the frankfurter rests on a V-shaped perforated rack.

U.S. Pat. No. 3,493,726, granted Feb. 3, 1970, to W. M. Bardeau, discloses a coated nonstick grilling surface.

U.S. Pat. Nos. 1,432,335 granted Oct. 17, 1922, to A. L. Howard, and No. 3,246,644, granted Apr. 19, 1966, to C. F. Peterson, disclose water heaters having tubular elements which extend over a heat source and through which the water circulates. U.S. Pat. No. 3,472,221, granted Oct. 14, 1969, to A. T. Stevens, discloses a melting grid for melting thermoplastic materials in which a heating fluid circulates through a zigzag coil.

DISCLOSURE OF THE INVENTION

A subject of the invention is a barbecue grill comprising first and second metal sheets, each having opposite upper and lower surfaces. The second metal sheet is positioned above the first sheet, with at least a portion of the upper surface of the first sheet spaced from the lower surface of the second sheet, to form a circulation passageway between the sheets for circulating cooling liquid. A plurality of spaced heat passageways extend perpendicular to, and are closed from communication with, the circulation passageway. Each heat passageway extends through the first and second sheets and opens onto the lower surface of the first sheet and the upper surface of the second sheet. Each of the sheets extends continuously between and around the heat passageways. The grill also comprises a reservoir in communication with the circulation passageway.

The spacing of the sheet surfaces and the forming of the heat passageways can be accomplished in a number of ways. For example, tubular grommets could be provided to hold the sheets in a spaced apart relation and form the walls of the heat passageways. However, the heat passageways are preferably formed by deforming portions of the sheets themselves. In a preferred embodiment, the sheets have a plurality of aligned holes extending therethrough. Portions of the sheets surrounding the holes are deformed to define the heat passageways and close communication between the heat passageways and the circulation passageway.

An optional preferred feature of the grill is a housing that forms the reservoir and has pan support surfaces. A pan having a bottom surface is configured to be supported by the pan support surfaces to position the bottom surface in the reservoir to receive heat from liquid in the reservoir for cooking food in the pan. Grills with this preferred feature may also have the additional feature of covers with aligned holes. A first cover is dimensioned to cover the upper surface of the second sheet, and a second cover is dimensioned to cover the pan. The first and second covers each have a substantially vertical portion with a plurality of spaced holes extending therethrough. The vertical portions and the holes in the first and second covers are positioned to locate the vertical portions closely adjacent to each other and to align the holes in the first cover with the holes in the second cover, when the first and second covers are placed over the sheets and the pan, respectively. This combination of features permits the elements of the grill to be arranged so that food on the upper surface of the second sheet is in a cooking chamber defined by the upper sheet and the cover therefor, and steam from the pan circulates through the cooking chamber to keep the food moist and assist in the cooking of the food. The circulating of the steam into and out from the pan also imparts a barbecued flavor to food cooking in the pan.

In most embodiments of the invention, it is contemplated that the second sheet will have a flat surface on which the food to be barbecued is placed. However, the configuration of the sheets can be varied. One desirable variation is to give the sheets a rounded, wok-like configuration. Such a configuration permits the cooking of relatively small pieces of food in the manner that food is cooked in a conventional wok, while at the same time giving the food a barbecued flavor.

Another subject of the invention is a barbecue grill assembly comprising a food support, a housing forming a reservoir chamber, and a pan. The food support has an upper surface for receiving food to be barbecued, a plurality of spaced openings in the support extending through the upper surface for exposing food thereon to a fire beneath the support, and at least one passageway extending through the support substantially parallel to the upper surface for circulating cooling liquid. The reservoir chamber is in communication with the passageway for supplying liquid thereto. The housing includes pan support surfaces. The pan has a bottom surface and is configured to be supported by the pan support surfaces to position the bottom surface in the reservoir chamber to receive heat from liquid in the reservoir chamber for cooking food in the pan. The housing may form one or more reservoir chambers. Embodiments with a plurality of chambers may have two reservoir chambers on opposite sides of the food support. This arrangement helps maximize circulation of cooling liquid, such as water, through the passageway and provides additional capacity for cooking vegetables and other food in pans.

The grill assembly of the invention may also include additional features, such as the wok-like configuration and the two-cover arrangement described above. The food support may be formed in various ways. For example, it may include a tubular member or members, such as a plurality of separate parallel tubes or a single serpentine tube. However, the food support is preferably formed by two metal sheets, as described above.

The barbecue grill apparatus of the invention solves the problem discussed above of the difficulty in cleaning conventional grills. The water or other cooling liquid in the passageway maintains the temperature of the cooking surface on which food is placed at a relatively low level. For example, in the case of circulating water, the surface temperature remains substantially at or below the boiling point of water, with excess heat being carried away by the circulating water. This prevents grease from burning on the cooking surface and bits of food from sticking to the cooking surface. Therefore, cleaning the grill is relatively easy. In the preferred embodiment in which the circulation passageway is formed by two sheets, the problem of crumbling of food that is encountered in connection with conventional parallel rod grill configurations is greatly diminished, if not eliminated. The apparatus of the invention has a relatively simple structure but provides a highly versatile system for cooking various types of food. The apparatus also permits boiling or steaming of vegetables and other foods to be accomplished at the same time, and with the same energy source, as the food being grilled.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 3 is a sectional view of the assembly shown in FIG. 2 illustrating a modified form of the reservoir cover, with center portions cut away and steaming of corn in one of the pans illustrated.

FIG. 4 is an elevational view, with parts shown in section, of a conventional type of barbecue fire bowl and support legs on which the apparatus shown in FIG. 3 is positioned.

FIG. 6 is a fragmentary pictorial view of portions of the apparatus shown in FIG. 5, with parts shown in section to illustrate the forming of the circulation passageway and the heat passageways.

FIG. 7 is an enlarged sectional view of a portion of FIG. 6.

FIG. 8 is a front elevational view of a modified form of the apparatus shown in FIG. 5 in which there is no pan at the side of the grilling surface.

FIG. 9 is like FIG. 8 except that it shows another modification in which there is a pan located on each of the two opposite sides of the center grilling portion of the apparatus.

FIG. 10 is like FIGS. 8 and 9 except that it shows the single pan configuration shown in FIG. 5 with the covers positioned to place the holes therein into alignment.

FIG. 11 is like FIG. 10 except that it shows the covers positioned to close off communication between the pan and the space above the grill surface.

FIG. 12 is a pictorial view of a third embodiment of the invention which is a variation of the embodiment shown in FIG. 5.

FIG. 13 is an exploded pictorial view of the embodiment shown in FIG. 12.

FIG. 14 is a sectional view of the assembled embodiment shown in FIG. 12 with a cover positioned on the wok portion to receive steam from the pan.

BEST MODES FOR CARRYING OUT THE INVENTION

The drawings show three embodiments 10, 110, 210 of barbecue grill apparatus that is constructed according to the invention and that also constitutes the best modes for carrying out the invention currently known to the applicant. FIG. 4 shows the apparatus of the invention being used with a conventional type of barbecue stand having a fire bowl 2 supported on legs 4. This apparatus 2, 4 is shown for the purpose of illustrating the use of the invention. It is intended to be understood that the apparatus of the invention can be used to advantage with various types of fire bowls and supports therefor, and with other types of cooking apparatus, including indoor cooking stoves.

Figure 1:
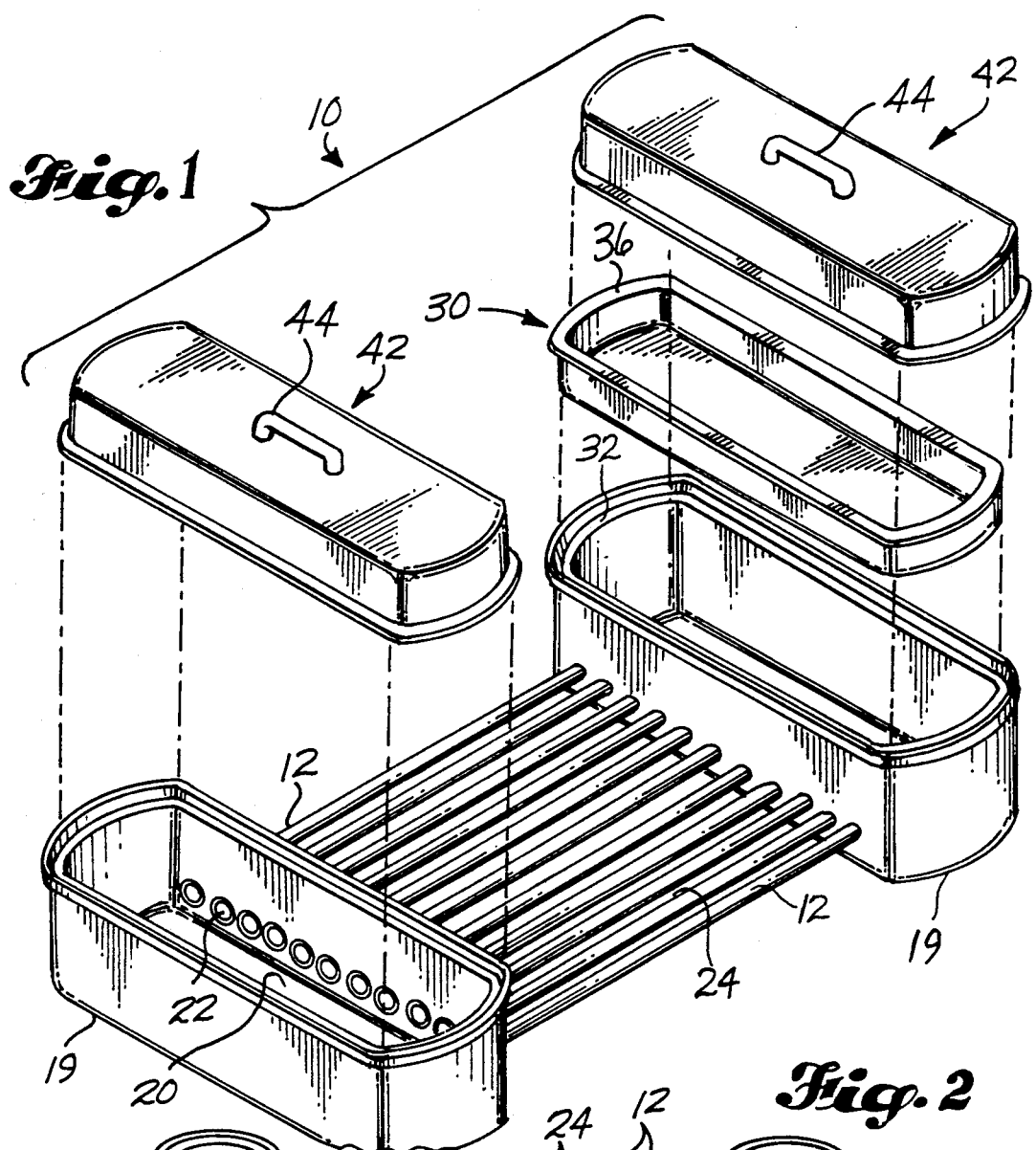
FIG. 1 is an exploded pictorial view of a first embodiment of the invention.
Figure 2:
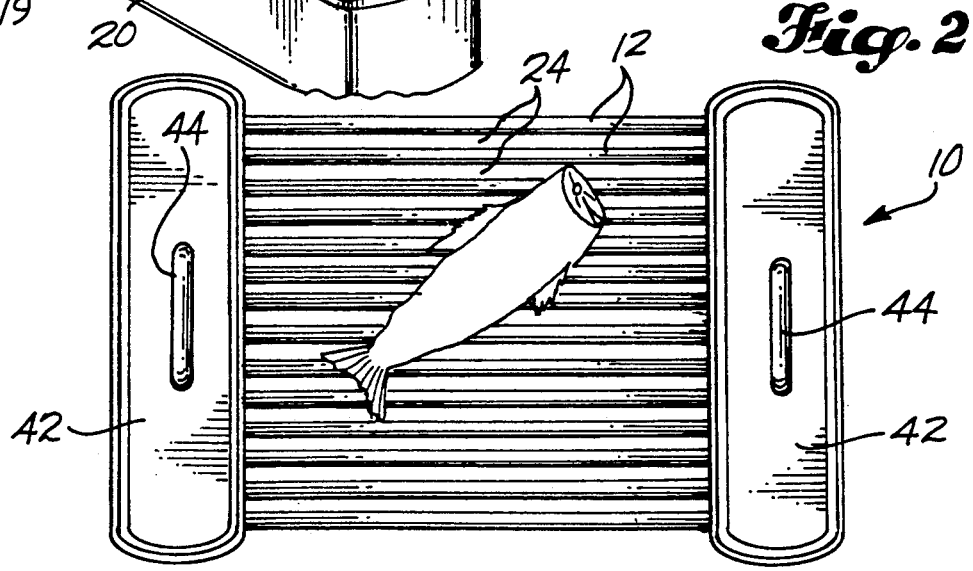
FIG. 2 is a top plan view of the apparatus shown in FIG. 1 in an assembled condition with a fish positioned on the upper surface of the food support for grilling.

The barbecue grill assembly of the invention comprises a food support for grilling food which is cooled by circulating liquid. FIGS. 1-4 show a first embodiment of the assembly 10. In this embodiment, the upper food support surface is formed by the upper surfaces of a plurality of parallel spaced tubes 12. FIGS. 2 and 4 illustrate a fish on the food support surface. The hollow interiors 22 of the tubes 12 form a plurality of separate circulation passageways for cooling the surfaces of the tubes 12. As in a conventional barbecue grill, the spaces 24 between the parallel grill members 12 provide a plurality of spaced openings in the food support for exposing food thereon to a fire beneath the support.

The assembly 10 has a housing that includes two separate oblong portions 19 on opposite ends of the tubes 12. Each portion 19 has a pan-like configuration and forms an open top reservoir chamber 20 (FIGS. 1 and 3). A sidewall of the chamber 20 has openings for receiving the ends of the tubes 12. The passageways 22 defined by the tubes are in open communication with each of the chambers 20, as shown in FIG. 1. In use, water is placed in the reservoir chamber 20 of each of the housing portions 19 and circulates between the portions 19 through the tubes 12. This cools the surfaces 40 of the tubes 12 so that they remain substantially at or below the boiling point of water.

In addition to serving as reservoirs for the cooling liquid, the housing portions 19 may also be used directly as cooking pans for boiling vegetables. Preferably, a separate pan 30 is provided to separate the vegetables or other food being cooked from the cooling water, as shown in FIG. 3. The pan 30 may be provided with perforations (not shown) or other means for steaming vegetables. The housing portions 19 each have a peripheral flange with an inner horizontal portion 32 for supporting the pan 30 with its bottom surface spaced above the inner bottom surface of the housing portion 19. The pan 30 has an upper horizontal lip 36 that engages the horizontal supporting surface 32 of the housing 19. Outwardly of the horizontal support surface 32, the housing flange extends vertically to define the space into which the lip 36 on the pan 30 is received. As shown in FIG. 3, the pan 30 is relatively shallow and extends into the reservoir 20 formed by the housing portion 19 to expose it to the heat of the circulating water while maintaining space between the pan bottom and the water. The pan 30 could also have a greater depth to bring it closer to or into actual contact with the water. The assembly also has a cover 42 with a handle 44 for the pan 30. A modified shallower form of the cover 42' may also be used to cover the pan 30 or the reservoir 20 without the pan 30, as shown in the right hand portions of FIGS. 3 and 4. The food support surface could be provided with a cover having alignable holes, as described below in reference to the embodiments shown in FIGS. 5-14. Both the pans and the covers therefor may be constructed to be used interchangeably either as pans or as covers. This type of construction preferably includes collapsible handles, such as the type of handle 144 shown in FIG. 5.

FIGS. 5-11 and 15-17 show a second embodiment of the barbecue grill assembly of the invention and variations thereof. The assemblies 110, 110', 110''' are currently the preferred embodiments of the invention. They have the advantages of providing better support for food so that it does not crumble, a more even temperature over the entire food support, and greater circulation of water for cooling.

Referring to FIGS. 5-7, 10, and 11, the assembly 110 comprises first and second metal sheets 112, 116. The second sheet 116 is spaced above the first sheet 112 with its opposite upper and lower surfaces aligned with and parallel to the opposite upper and lower surfaces of the first sheet 112. The main portions of the two sheets 112, 116 are flat and horizontal and form a circulation passageway 122 between the upper surface of the first sheet 112 and the lower surface of the second sheet 116. The peripheral portion of the upper second sheet 116 is bent upwardly to form vertical sides 118. Similarly, the peripheral portion of the first sheet 112 forms vertical sides 114. The horizontal portion of the lower sheet 112 extends laterally beyond the vertical sides 118 of the second sheet 116. The extended horizontal portion of the first sheet 112 and the vertical walls 114, 118 adjacent thereto form a housing that defines a reservoir 120. Water in the reservoir 120 is circulated through the circulation passageway 122 and the space between the walls 114, 118 around the main grilling portion.

Each of the sheets 112, 116 has a plurality of spaced holes extending vertically therethrough. The holes in the first sheet 112 are aligned with the holes in the second sheet 116. Portions of each sheet 112, 116 around the holes are deformed to define vertical heat passageways 124. These passageways 124 are perpendicular to, and closed from communication with, the horizontal circulation passageway 122. The heat passageways 124 perform the same function as the spaces 24 between the tubes 12 in the embodiment shown in FIGS. 1-4. They expose food placed on the upper surface of the food support formed by the second sheet 116 directly to a fire below the assembly 110 to barbecue grill the food.

The structure of the circulation passageway 122, heat passageways 124, and the deformed portions of the sheets 112, 116 can best be seen in FIGS. 6 and 7. The edges of the sheet 112 around the holes are deformed so that they curve vertically upwardly to form the generally vertical sidewalls 126 of the heat passageways 124. The upper ends of these walls 126 are bent outwardly to form substantially horizontal flanges about which the edges of the sheet 116 around the holes are crimped. The crimped edges 128 of the sheet 116 are best seen in FIG. 7. In addition to forming the heat passageways 124, the deformation of the sheets 112, 116 around the holes maintains the sheets 112, 116 in a position in which they are parallel to and spaced from each other. The sheets 112, 116 and the circulation passageway 122 formed therebetween extend continuously between and around the heat passageways 124. As can be seen in FIGS. 6, 10, and 11, the circulation passageway 122 is in open communication with the reservoir 120 along the entire lateral edge of the sidewall 118 of the upper sheet 116.

Figure 15:
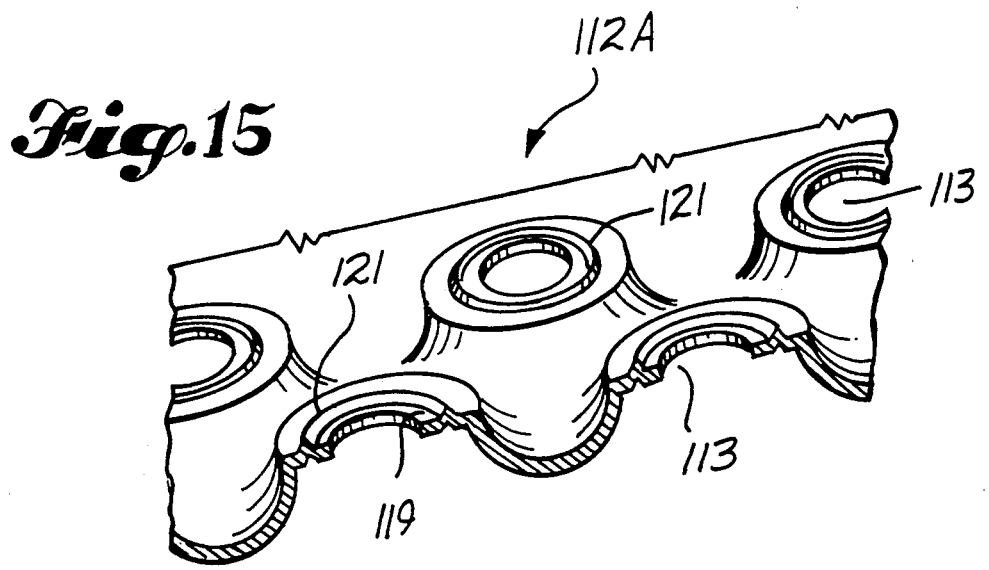
FIG. 15 is a fragmentary pictorial view of a modified form of the lower sheet shown in FIGS. 6 and 7.
Figure 16:
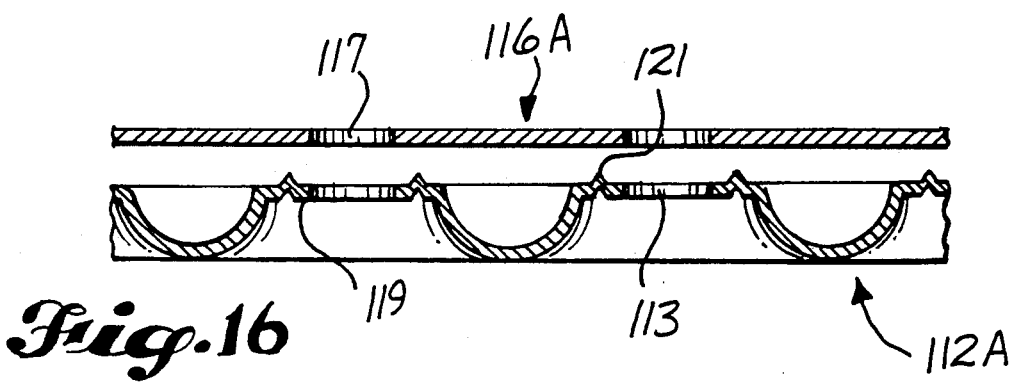
FIG. 16 is a sectional view of the lower sheet shown in FIG. 15 and a corresponding upper sheet.
Figure 17:
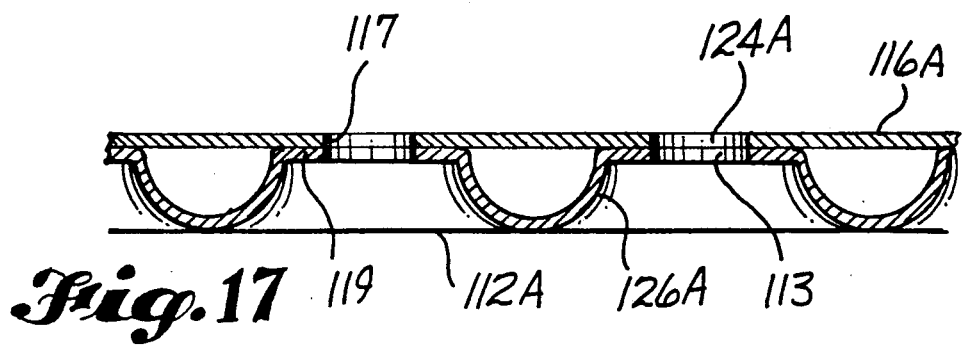
FIG. 17 is like FIG. 16 except that it shows the two sheets joined.

FIGS. 15-17 illustrate a modified form of the two sheets 112A, 116A and an alternative method of joining the sheets 112A, 116A. Referring to FIG. 15, the lower sheet 112A has a plurality of holes 113 extending vertically therethrough. As in the sheet 112 shown in FIGS. 6 and 7, the edges of the sheet 112A around the holes 113 are deformed upwardly and then horizontally to form the generally vertical sidewalls 126A of the heat passageways 124A and a horizontal flange 119 around each hole 113. An upwardly projecting ridge 121 is formed on each flange 119 around the hole 113. Referring to FIG. 16, the upper sheet 116A is flat and has a plurality of holes 117 alignable with the holes 113 in the lower sheet 112A. The sheets 112A, 116A are joined by clamping them together and passing an electric current through the clamp. The current passes from sheet to sheet through the areas of contact defined by the ridges 121 and thereby heats the ridges 121. The heated ridges melt, and the clamps continue to urge the sheets 112A, 116A together to fuse them to each other along the ridge areas (FIG. 17). This procedure is known as projection welding and is a form of resistance welding. It is desirable as a method for joining the sheets 112A, 116A because it is easy and inexpensive to carry out and produces strong and reliable joints.

Figure 5:
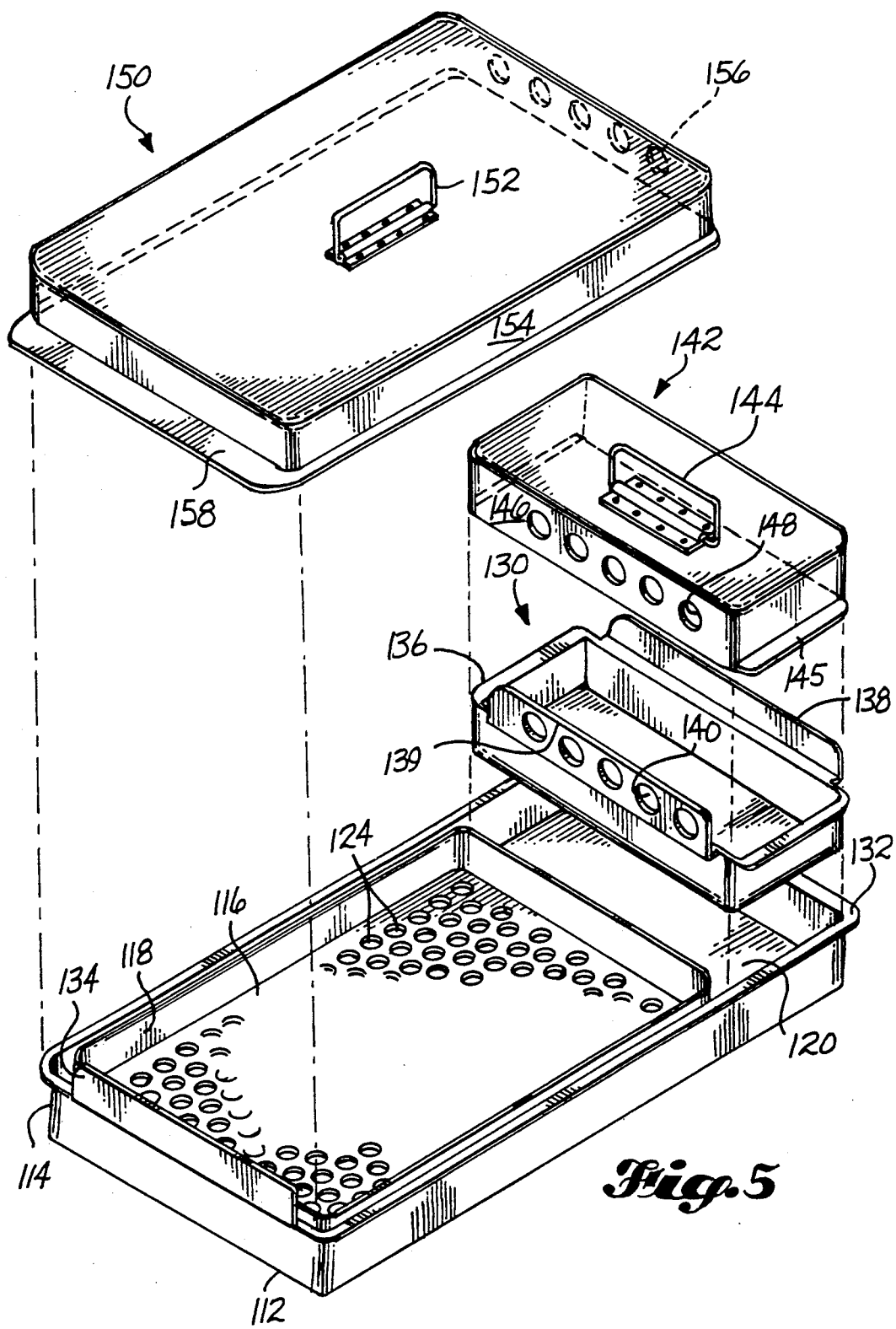
FIG. 5 is an exploded pictorial view of another currently preferred embodiment of the invention.

Referring again to FIGS. 5, 10, and 11, the assembly 110 includes further elements in addition to the grilling area and reservoir formed by the sheets 112, 116. FIGS. 10 and 11 show the elements in an assembled condition. The details of the structure of the elements can be seen in FIG. 5, which is an exploded pictorial view. Referring to FIG. 5, the assembly 110 includes a pan 130 that is configured to be supported by the housing formed by the peripheral portions of the sheets 112, 116 and to extend downwardly into the reservoir 120. This allows food placed in the pan 130 to be cooked using heat from water in the reservoir 120. The outer peripheral edge of the vertical wall 114 has a horizontal lip 132 for supporting the pan 130. The opposite ends of the pan 130 each have a horizontal flange 136 which engages the lip 132, as illustrated in FIGS. 10 and 11. The sides of the pan 130 have vertical extensions 138, 139 with lower horizontal portions, one of which also engages the lip 132.

Referring to FIG. 5, one of the vertical extensions 139 has a plurality of spaced holes 140 extending horizontally therethrough. The extension 138 is continuous with no holes therein. The holes 140 in the extension 139 may be aligned with holes 148 in a cover 142 for the pan 130, as described further below. The cover 142 has a top handle 144 and a horizontal lip 145 on each of its ends. When the cover 142 is placed over the pan 130 to cover the pan 130, the lips 145 rest on the flanges 136 on the pan 130. The cover 142 has vertical sidewalls 146. On one side of the cover 142, the sidewall 146 is provided with a plurality of holes 148 positioned to be aligned with the holes 140 in the pan's upward extension 139.

The assembly 110 also includes a cover 150 for the grilling portion defined by the vertical walls 118 of the upper sheet 116. The cover 150 has a top handle 152 and a vertical sidewall 154 extending around its periphery. On one side of the cover 150, the vertical sidewall 154 has a plurality of holes 156 extending horizontally therethrough. On the opposite side of the cover 150, a horizontal flange 158 is formed. The holes 156 are positioned to be aligned with the holes 140, 148 in the pan 130 and pan cover 142 when the pan 130 and covers 142, 150 are in the position shown in FIG. 10. In this position, the sidewall 146 of the cover 142 and the vertical extension 139 of the pan 130 together form what may be viewed as a vertical sidewall of a cover for the pan 130. This vertical sidewall 139, 146 is closely adjacent to the vertical sidewall 154 of the grill cover 150. This relative positioning of the covers directs steam from the pan 130 to enter the chamber formed by the cover 150 and the upper sheet 116 to moisturize and cook the food therein. The slight gap between the vertical extension 139 and the cover sidewall 154 permits some venting of steam from the pan 130.

If desired, communication between the pan 130 and the grill cooking chamber can be cut off simply by reversing the position of one or both of the pan 130 and the pan cover 142. FIG. shows the pan cover 142 reversed by rotating it 180° to out off escape of steam from the pan 130. If it is desired to still provide steam to the grill cooking chamber, the grill cover 150 may also be rotated 180°, as shown in FIG. 11, so that it receives steam from the space between the sheet sidewalls 114, 118. When the cover 150 is in this rotated position, a vertical flange 134 carried by the lower sheet 112 closes off the holes 156 in the cover 150. If it is not desired to provide steam to the food being grilled, the cover 150 may either be removed or kept in the position shown in FIG. 10.

Each of FIGS. 8 and 9 shows a modification of the assembly 110 shown in FIGS. 5, 10, and 11. The assembly 110' shown in FIG. 8 does not include any pan and has a small reservoir 120' on each side of the vertical wall 118' of the upper sheet 116'. The assembly 110" shown in FIG. 9 has a pan 130" on each side of the vertical wall 118". The grilling chamber may be placed in communication with one or both of the pans 130". As shown in FIG. 9, the pan 130" on the left and the pan cover 142" on the right are positioned to cut off communication with both pans 130". The other elements of the assemblies 110', 110" are substantially the same as the corresponding elements of the assembly 110 shown in FIGS. 5, 10, and 11 and are indicated by the same reference characters except that a prime is added in FIG. 8 and a double prime is added in FIG. 9.

FIGS. 12-14 show a third embodiment 210 of the assembly of the invention which is a modification of the assembly 110 shown in FIGS. 5, 10, and 11. The assembly 210 has lower and upper sheets 212, 216 that have a rounded, wok-like configuration. Each of these sheets 212, 216 has a main bowl portion. This portion of the upper sheet 116 forms a rounded grill surface for wok-like barbecue cooking. As in the assembly 110, the lower sheet 212 has an extension that defines a reservoir 220. The upper sheet 216 has a horizontal flange 217 that extends over the top of the vertical sidewalls of the extension of the lower sheet 212 to define a side edge of a rectangular opening for receiving a pan 230. The upper edge 219 of the top sheet 216 is rolled around the lower sheet 212. A circulation passageway 222 is defined between the rounded bowl portions of the sheets 212, 216. Heat passageways 224 extend through the sheets 212, 216 and are formed in the same manner as the heat passageways 124 described above.

The pan 230 has a horizontal lip 236 on each of its ends for engaging the upper edge of the vertical sidewall of the lower sheet 212. L-shaped flanges 238, 239 on the opposite sides of the pan 230 engage this upper edge and the top surface of the top sheet flange 217. The vertical portion of the flange 239 has a plurality of horizontally spaced holes 240 extending therethrough. A cover 242 for the pan 230 has a top handle 244 and a horizontal lip 245 on each end. One side of the vertical sidewall 246 of the cover 242 has a plurality of holes 248 positioned to be alignable with the holes 240 in the pan flange 239. These holes 240, 248 are alignable with holes 256 in a cover 250 for the wok-like grilling portion. The cover 250 has a handle 252 and a lateral extension 251 that terminates in a vertical sidewall 254 in which the holes 256 are formed. The alignment of the holes 240, 248, 256 for communicating the pan 230 with the wok grilling chamber is illustrated in FIG. 14.

As used herein, the terms "upper", "lower", "above", "bottom" and the like are used to indicate the normal use position of the assembly of the invention shown in the drawings.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. A barbecue grill comprising a first metal sheet having opposite upper and lower surfaces; a second metal sheet having opposite upper and lower surfaces and being positioned above said first sheet, with at least a portion of said upper surface of said first sheet being spaced from said lower surface of said second sheet, to form a circulation passageway between said sheets for circulating cooling liquid; a plurality of spaced heat passageways extending perpendicular to, and closed from communication with, said circulation passageway; each said heat passageway extending through said first and second sheets and opening onto said lower surface of said first sheet and said upper surface of said second sheet, and each of said sheets extending continuously between and around said heat passageways; and a reservoir in communication with said circulation passageway.

2. The grill of claim 1, in which said sheets have a plurality of aligned holes extending therethrough, and portions of said sheets surrounding said holes are deformed to define said heat passageways and close communication between said heat passageways and said circulation passageway.

3. The grill of claim 1, comprising a housing that forms said reservoir and has pan support surfaces; and a pan that has a bottom surface and is configured to be supported by said pan support surfaces to position said bottom surface in said reservoir to receive heat from liquid therein for cooking food in said pan.

4. The grill of claim 3, comprising a first cover dimensioned to cover said upper surface of said second sheet, and a second cover dimensioned to cover said pan; said first cover having a substantially vertical portion with a plurality of spaced holes extending therethrough, said second cover having a substantially vertical portion with a plurality of spaced holes extending therethrough, and said vertical portions and said holes in said first and second covers being positioned to locate said vertical portions closely adjacent to each other and to align said holes in said first cover with said holes in said second cover, when said first and second covers are placed over said sheets and said pan, respectively.

5. The grill of claim 4, in which said sheets have a rounded, wok-like configuration.

6. The grill of claim 1, in which said sheets have a rounded, wok-like configuration.

7. A barbecue grill assembly comprising a food support having an upper surface for receiving food to be barbecued, a plurality of spaced openings in said support extending through said upper surface for exposing food thereon to a fire beneath said support, and at least one passageway extending through said support substantially parallel to said upper surface for circulating cooling liquid; a housing forming a reservoir chamber in communication with said passageway for supplying liquid thereto, said housing including pan support surfaces; and a pan having a bottom surface and being configured to be supported by said pan support surfaces to position said bottom surface in said chamber to receive heat from liquid in said chamber for cooking food in said pan.

8. The assembly of claim 7, in which said housing defines two reservoir chambers on opposite sides of said food support, each said chamber being in communication with said passageway; and said housing has pan support surfaces associated with each of said chambers.

9. The assembly of claim 8, in which said food support comprises first and second metal sheets having portions spaced apart from each other to form said passageway between said sheets, said passageway extending continuously between and around said openings.

10. The grill of claim 7, comprising a first cover dimensioned to cover said food support, and a second cover dimensioned to cover said pan; said first cover having a substantially vertical portion with a plurality of spaced holes extending therethrough, said second cover having a substantially vertical portion with a plurality of spaced holes extending therethrough, and said vertical portions and said holes in said first and second covers being positioned to locate said vertical portions closely adjacent to each other and to align said holes in said first cover with said holes in said second cover, when said first and second covers are placed over said food support and said pan, respectively.

11. The assembly of claim 10, in which said food support has a rounded, wok-like configuration.

* * * * *